No. 783,059. PATENTED FEB. 21, 1905.
J. Z. MILLER.
BREAD BAKING PAN.
APPLICATION FILED MAR. 5, 1904.
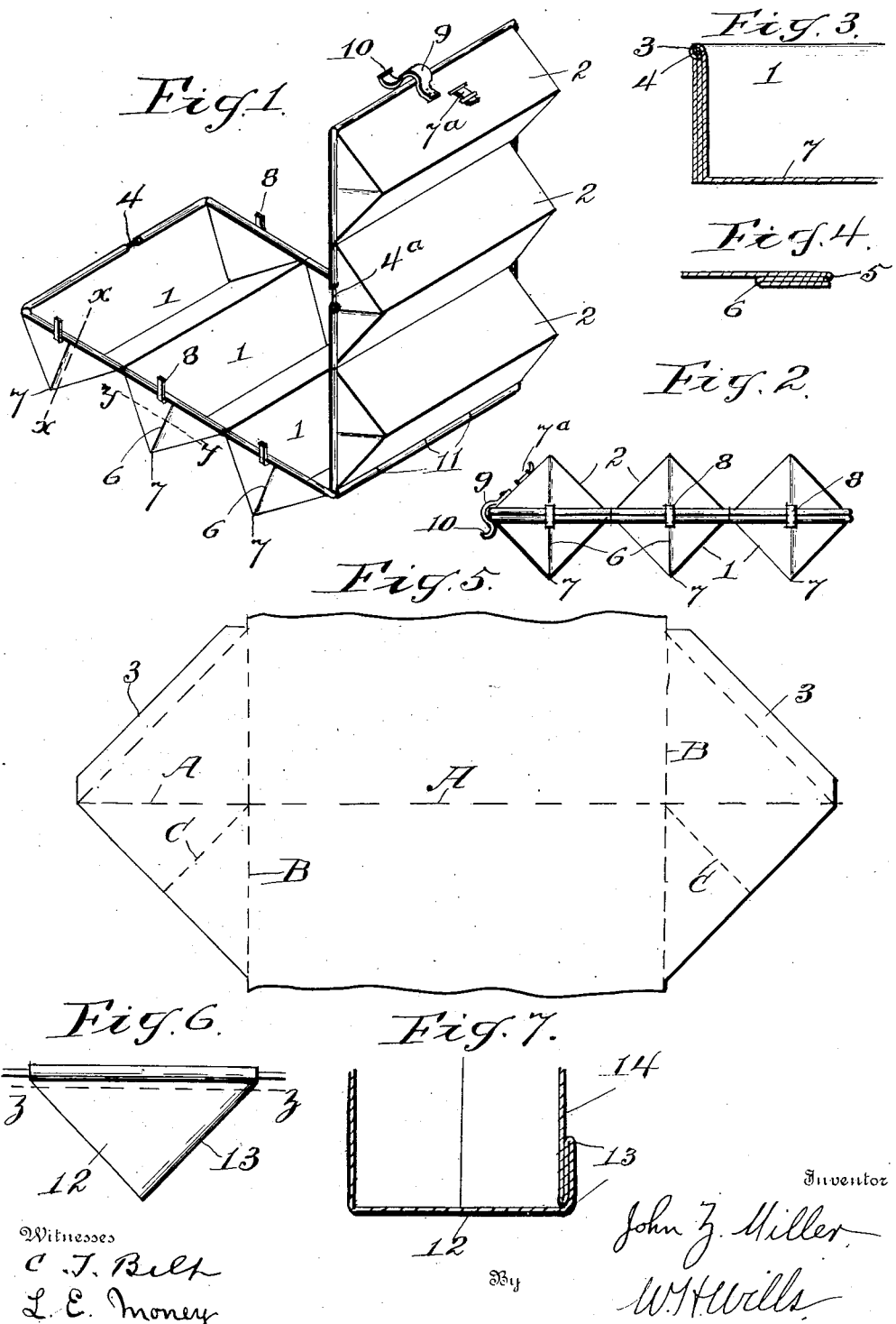
Witnesses
C. J. Bilt
L. E. Money
Inventor
John Z. Miller
By W. H. Wills
Attorney No. 783,059.

Patented February 21, 1905.

UNITED STATES PATENT OFFICE.

JOHN Z. MILLER, OF HAGERSTOWN, MARYLAND.

BREAD-BAKING PAN.

SPECIFICATION forming part of Letters Patent No. 783,059, dated February 21, 1905.

Application filed March 5, 1904. Serial No. 196,659.

*To all whom it may concern:*

Be it known that I, JOHN Z. MILLER, a citizen of the United States, residing at Hagerstown, in the county of Washington and State of Maryland, have invented certain new and useful Improvements in Bread-Baking Pans, of which the following is a specification.

This invention relates to baking-pans, and pertains especially to bread-baking pans for baking square loaves of bread.

The object of the invention is to provide a baking-pan of such novel and peculiar construction that it may possess the least amount of oven-bearing surface possible, that each pan and cover-section may have its walls entirely exposed to the oven heat, and that there may be no interference or interruption of the circulation of heat back and forth between and around the said sections.

A further object of the invention is to provide a pan having separate and independent sections all formed of a single piece of metal and a pan-cover in duplication of the pan, the metal of each of which is cut, struck up, or stamped, folded, and crimped about a surrounding rod-frame, so as to form individual receptacles having their bottom edges forming oven-bearings.

A still further object of the invention is to provide a pan and pan-cover each comprising a single piece of metal which is so folded and crimped about a central surrounding frame of wire or rod without seaming, soldering, or riveting, as to form a steam, air, and water tight pan having individual sections or receptacles for baking square loaves of bread.

As far as known to me pans of this class having a cover in duplication of the pan-bottom are confined to baking circular bread. Other pans have V-shaped bread-receptacles and a flat top provided with depending projections. None of such pans are air, water, or steam tight, and they all have end flanges which prevent circulation of heat back and forth between the sections thereof and none of which bake square loaves of bread with one angle of the loaf nearest the bottom of the pan. Owing to the shape and construction of such pans, it is difficult to remove a bread-loaf therefrom without breaking it or its crust. It is therefore the purpose of this invention to overcome and obviate the existing difficulties and disadvantages found in bread-baking pans and to furnish a pan of simple, novel, and inexpensive construction for the baking of square loaves of bread.

In the accompanying drawings, forming part of this application, Figure 1 is a perspective view showing the cover raised. Fig. 2 is an end view showing the cover closed. Fig. 3 is a detail section on the line $x\,x$, Fig. 1. Fig. 4 is a like view on the line $y\,y$, Fig. 1. Fig. 5 is a detail plan view of enough of the pan-bottom material to form one section, the dotted lines showing the folds. Fig. 6 is an end view of a single pan, showing a modification. Fig. 7 is a section on the line $z\,z$, Fig. 6.

The same numeral references denote the same parts throughout the several views of the drawings.

The pan-cover being of duplicate construction to the pan, the latter will only be described herein in detail.

In order to make the pan and its cover air, steam, and water tight, the metal is cut, struck up, or stamped so as to form a blank for each section 1 in one and the same piece for the pan and in one and the same piece to form the cover-sections 2. As shown in Fig. 5, which is the preferred form of folding, the blank end is angular, with one edge thereof provided with a narrow flange 3, which after said end is folded, as hereinafter described, is curled or crimped about a rod or stiff wire 4, which constitutes the frame of the pan. A like rod or wire $4^a$ forms the cover-frame. Across the central line A of the blank, which extends to the point of the blank end, is a line B, and from the crossing-point of the line A and B is drawn a line C to the edge of the said end opposite the said flanged edge. The metal being bent inwardly on the line A and outwardly on the line C will form the folds 5 and 6, respectively, and by being bent on the central line A until the fold 5 strikes the line B to the right of line A the fold 6 is positioned and extends from the oven-bearing edge 7 up to the flange 3 and against the rod 4, where it is securely held by curling or crimping the flange about the rod. The ends of each pan-section, as well as the cover-sections, are in this manner formed steam and water tight without employing seams, rivets, or solder, and the metal is continued from one to the other of the sections to make them, there being no cutting or separating the metal for each section, and there is no intermediate seams, joints, or frames other than the surrounding rod-frame for the cover and a like one for the pan.

The cover is provided with a slidable proof-door 7ᵃ. The pan-sections have upon each end a projection 8, between which the cover closes and is prevented from displacement. A suitable spring-catch 9 is secured to the cover to hook under the frame 4 and has a hand-grasp 10 for raising the cover, the latter being hinged to the pan-frame at 11.

It will be seen that the edges of the pan-sections constitute the only bearing of the pan on an oven, that the bread is baked with one edge of the loaf in the said bearing edges and the opposite edge in the edge of the cover, that half the loaf is held by the pan-sections and the other half is located in the cover-sections, and that uniform baking is accomplished by such location and arrangement and by the spaces between the sections being open at each end, affording free circulation of heat.

Referring to the modification shown in Figs. 6 and 7, a portion of the end 12 is folded at 13 against the side 14 of the pan instead of against the end, as shown in the preferred form.

It is obvious that the number and size of the sections may be increased or diminished as desired or as the trade may demand.

Having thus described my invention, what I claim as new, and desire to secure by Letters Patent, is—

1. A utensil for baking square loaves of bread, comprising a set of pan-sections V-shaped in cross-section, a set of cover-sections V-shaped in cross-section, and the hinged frames, each set of sections being in a single piece of metal and having bearing edges and provided with ends one half thereof being folded and the other half having a flange secured to the frames.

2. A utensil for baking square loaves of bread, comprising a plurality of pans in a single piece of metal and V-shaped in cross-section, a plurality of pan-covers in a single piece of metal and V-shaped in cross-section, and the hinged frames, one side of the pans and covers terminating in a double-folded end portion, and the other side terminating in an unfolded end portion having a flange overlapping the folded portion and secured to the frames.

3. A multiple baking-pan comprising a series of individual contiguous pans in a single piece of metal and V-shaped in cross-section the bottom edges of the pans forming an exclusive rest or bearing for the pan, and the ends of the pan having folds in one portion thereof perpendicular to the said edges and the other portion having a flange overlapping the said folds, and a suitable frame to which the said flange is secured.

In witness whereof I hereunto set my hand in the presence of two witnesses.

JOHN Z. MILLER.

Witnesses:
EZRA NEWCOMER,
NERVIN J. BRANDT.